(12) United States Patent
Bradley et al.

(10) Patent No.: US 10,392,058 B2
(45) Date of Patent: Aug. 27, 2019

(54) SYSTEM FOR LUBRICATING A PIVOT INTERFACE OF A WORK VEHICLE

(71) Applicant: CNH Industrial America, LLC, New Holland, PA (US)

(72) Inventors: Nathan J. Bradley, Muscatine, IA (US); Ryan Ogg, Burlington, IA (US); Anthony J. Lamela, Gilberts, IL (US); Matthew Arnold, Burlington, IA (US); Marvin L. Linder, Carman, IL (US); Nathaniel B. Waller, New Lenox, IL (US); Wayne E. Bietz, Burlington, IA (US)

(73) Assignee: CNH Industrial America LLC, New Holland, PA (US)

( * ) Notice: Subject to any disclaimer, the term of this patent is extended or adjusted under 35 U.S.C. 154(b) by 126 days.

(21) Appl. No.: 15/726,480

(22) Filed: Oct. 6, 2017

(65) Prior Publication Data

US 2019/0106165 A1    Apr. 11, 2019

(51) Int. Cl.
| | |
|---|---|
| *B62D 55/092* | (2006.01) |
| *B62D 55/104* | (2006.01) |
| *F16C 17/10* | (2006.01) |
| *B62D 55/088* | (2006.01) |
| *F16C 33/66* | (2006.01) |
| *F16C 19/54* | (2006.01) |

(52) U.S. Cl.
CPC ....... *B62D 55/092* (2013.01); *B62D 55/0887* (2013.01); *B62D 55/104* (2013.01); *F16C 17/102* (2013.01); *B60Y 2410/102* (2013.01); *F16C 19/54* (2013.01); *F16C 33/6622* (2013.01); *F16C 33/6625* (2013.01); *F16C 2326/20* (2013.01)

(58) Field of Classification Search
CPC .............. B62D 55/092; B62D 55/0887; B62D 55/104; F16C 17/102; F16C 2326/20; F16C 19/54; F16C 33/6625; F16C 33/6622; B60Y 2410/102
See application file for complete search history.

(56) References Cited

U.S. PATENT DOCUMENTS

| | | |
|---|---|---|
| 5,221,484 A | 6/1993 | Goldsmith et al. |
| 5,658,053 A | 8/1997 | Vencill et al. |

(Continued)

*Primary Examiner* — Kevin Hurley
*Assistant Examiner* — Marlon A Arce
(74) *Attorney, Agent, or Firm* — Peter K. Zacharias; Patrick M. Sheldrake

(57) ABSTRACT

A system for lubricating a pivot interface defined between adjacent components of a work vehicle may include a shaft and a shaft housing configured to receive an axial portion of the shaft such that the shaft housing is configured to rotate relative to the shaft. The system may also include an end cap installed relative to an end of the shaft housing and a sealing device configured to seal a radial gap defined between the shaft housing and the shaft at a seal location when a fluid pressure within the housing is below the seal's cracking pressure. Additionally, when the fluid pressure within the housing exceeds the cracking pressure, the sealing device may be configured to transition to an unsealed state to allow lubricant contained within the housing to flow axially between the sealing device and the shaft and be subsequently purged from the housing.

20 Claims, 7 Drawing Sheets

(56) References Cited

U.S. PATENT DOCUMENTS

| | | | |
|---|---|---|---|
| 6,324,952 B1* | 12/2001 | Daly | A01G 23/091 |
| | | | 144/34.1 |
| 6,776,261 B2* | 8/2004 | Eriksen | F16C 19/52 |
| | | | 184/6.4 |
| 8,870,461 B2 | 10/2014 | Hansen | |
| 9,844,979 B2* | 12/2017 | Gobbs | B60B 27/06 |
| 2002/0088216 A1 | 7/2002 | Horejsi et al. | |
| 2015/0137486 A1 | 5/2015 | Smith et al. | |

* cited by examiner

SYSTEM FOR LUBRICATING A PIVOT INTERFACE OF A WORK VEHICLE

FIELD OF THE INVENTION

The present subject matter relates generally to systems for lubricating pivot interfaces of a work vehicle and, more particularly, to a system for lubricating a pivot interface defined between adjacent components of a work vehicle, such as between a pivot shaft and a corresponding pivot shaft housing of a track assembly of the work vehicle.

BACKGROUND OF THE INVENTION

Tracked work vehicles, such as bulldozers, often include a pivot shaft rigidly coupled to the vehicle's chassis about which the track assemblies pivot to allow relative motion between the track assemblies and the chassis. For instance, each track assembly typically includes a pivot tube or pivot shaft housing rigidly coupled to the track frame that is configured to receive a portion of the pivot shaft to allow a pivot interface to be defined between the pivot shaft and the corresponding pivot shaft housing. To prevent excess wear and ensure desired component life, the pivot interface defined between the pivot shaft and the pivot shaft housing must be continuously lubricated.

Unfortunately, to date, lubrication systems have proven ineffective at properly lubricating such pivot interface and for allowing contaminated lubricant to be properly purged from the pivot shaft housing. Among other things, conventional lubrication systems often exhibit issues with directing lubricant along the entire axial length of the pivot interface. Moreover, when adding new lubricant or otherwise re-lubricating the pivot interface, conventional lubrication systems do not allow for the pre-existing lubricant to be evacuated from the pivot shaft housing in an effective and efficient manner.

Accordingly, an improved system for lubricating a pivot interface defined between adjacent components of a work vehicle, such as between a pivot shaft and a corresponding pivot shaft housing of a track assembly of the work vehicle, would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for lubricating a pivot interface defined between adjacent components of a work vehicle. The system may include a shaft and a shaft housing defining a shaft cavity extending axially between a first axial end of the shaft housing and an opposed second axial end of the shaft housing, with the first axial end corresponding to a sealed end of the housing. An axial portion of the shaft may be received within the shaft cavity between the first and second axial ends such that the shaft housing is configured to rotate relative to the shaft about an axis. Additionally, a radial gap may be defined within the shaft cavity between an inner surface of the shaft housing and an outer surface of the shaft. The system may also include a bushing positioned within the shaft cavity at a bushing location disposed axially between the first and second axial ends of the shaft housing. The bushing may extend radially between the shaft housing and the shaft at the bushing location. Moreover, the system may include a sealing device positioned within the shaft cavity at a seal location disposed axially between the bushing and the second axial end of the shaft housing. The sealing device may be configured to seal the radial gap defined between the shaft housing and the shaft at the seal location when a fluid pressure within the shaft cavity is below a cracking pressure for the sealing device. Further, when the fluid pressure within the shaft cavity exceeds the cracking pressure, the sealing device may be configured to transition to an unsealed state at the seal location to allow lubricant contained within the shaft cavity to flow axially between the sealing device and the shaft towards the second axial end of the shaft housing.

In another aspect, the present subject matter is directed to a work vehicle. The work vehicle may include a chassis, a pivot shaft rigidly coupled to the chassis, and a track assembly including a pivot shaft housing. The pivot shaft housing may define a shaft cavity extending axially between a first axial end of the pivot shaft housing and an opposed second axial end of the pivot shaft housing, with an axial portion of the pivot shaft being received within the shaft cavity between the first and second axial ends such that the pivot shaft housing is configured to rotate relative to the pivot shaft about an axis to allow the track assembly to pivot relative to the chassis. In addition, a radial gap may be defined within the shaft cavity between an inner surface of the pivot shaft housing and an outer surface of the pivot shaft. The work vehicle may also include an end cap installed relative to the first axial end of the pivot shaft housing and a bushing positioned within the shaft cavity at a bushing location disposed axially between the end cap and the second axial end of the pivot shaft housing. Moreover, the work vehicle may also include a sealing device positioned within the shaft cavity at a seal location disposed axially between the bushing and the second axial end of the pivot shaft housing. The sealing device may be configured to seal the radial gap defined between the pivot shaft housing and the pivot shaft at the seal location when a fluid pressure within the shaft cavity is below a cracking pressure for the sealing device. Further, when the fluid pressure within the shaft cavity exceeds the cracking pressure, the sealing device may be configured to transition to an unsealed state at the seal location to allow lubricant contained within the shaft cavity to flow axially between the sealing device and the pivot shaft towards the second axial end of the pivot shaft housing.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
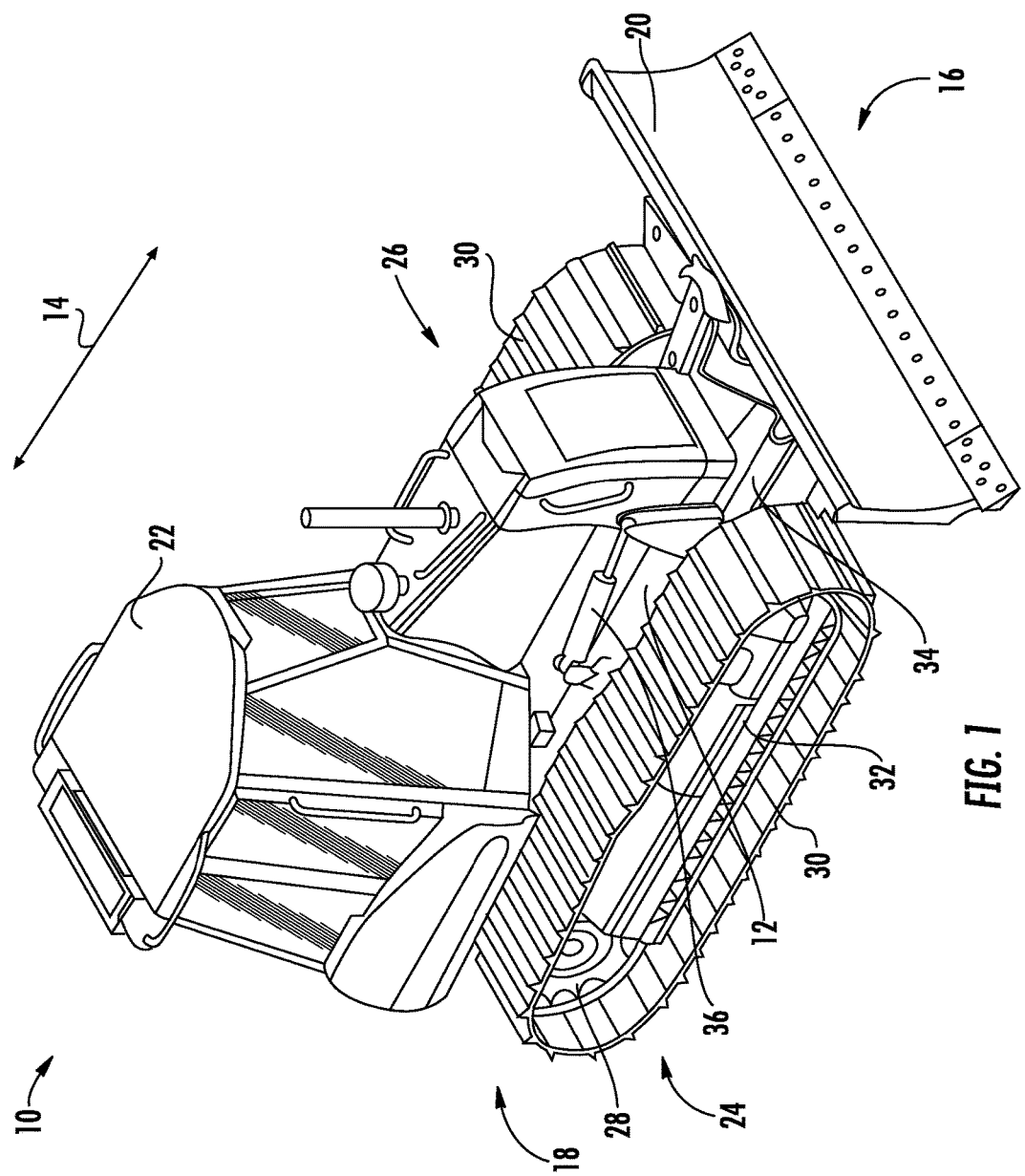
FIG. 1 illustrates a perspective view of one embodiment of a work vehicle in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system for lubricating a pivot interface defined between adjacent components of the work vehicle. Specifically, in several embodiments, the system will be described herein with reference to the pivot interface defined between a pivot shaft rigidly coupled to the vehicle's chassis and a corresponding pivot shaft housing of one of the vehicle's track assemblies. However, in other embodiments, aspects of the disclosed system may be advantageously utilized to lubricate any other suitable pivot interface defined between adjacent components of a work vehicle.

As will be described below, the disclosed system allows for a pivot interface to be properly lubricated while still allowing old or contaminated lubricant to be effectively purged from the pivot interface. For example, in one embodiment, the system may include one or more bushings disposed at the pivot interface that have suitable features for allowing lubricant to flow through, along, and/or across the bushings, thereby permitting for desired axial distribution of the lubricant across the pivot interface. Additionally, in one embodiment, the system may include a sealing device configured to seal off the pivot interface during normal operating conditions. However, when the fluid pressure of the lubricant contained at the pivot interface exceeds a cracking pressure of the sealing device (e.g., when new lubricant is being pumped or injected therein), the sealing device may transition to an unsealed state to allow any pre-existing lubricant to be purged from the interface.

Referring now to the drawings, FIG. 1 illustrates a perspective view of one embodiment of a work vehicle 10. As shown, the work vehicle 10 is configured as a bulldozer or "dozer" (also referred to a crawler-tractor). However, in other embodiments, the work vehicle 10 may be configured as any other suitable work vehicle known in the art.

In general, the work vehicle 10 may include a chassis 12 extending longitudinally (e.g., as indicated by arrow 14 in FIG. 1) between a forward end 16 of the vehicle 10 and an aft end 18 of the vehicle 10. The chassis 12 may generally be configured to support various components of the work vehicle 10. For example, the chassis 12 may be configured to support a grading implement, such as a blade 20, at the forward end 16 of the vehicle 10 and an enclosed operator's cab 22 at the aft end 18 of the vehicle 10. In addition, an engine (not shown) of the vehicle 10 may be fixed to the chassis 12 for driving first and second track assemblies 24, 26 of the vehicle 10. Each track assembly 24, 26 may generally include a drive wheel 28 rotationally coupled to the engine and an endless track 30 driven by the drive wheel 28. Each track assembly 24, 26 may also include a track frame 32 configured to support the drive wheel 28 and the endless track 30. As will be described below, the track frame 32 of each track assembly 24, 26 may, in several embodiments, be pivotally coupled to the chassis 12 to allow the track assemblies 24, 26 to pivot relative to the chassis 12 during operation of the vehicle 10.

In several embodiments, the blade 20 may be configured to be pivotally coupled to the chassis 12 to allow the relative position of the blade 20 to be adjusted (e.g., when performing a grading operation). For example, as shown in FIG. 1, in one embodiment, the blade 20 may be coupled to the chassis 12 via a pair of pivot arms 34. In such an embodiment, the work vehicle 10 may also include a hydraulic system including one or more hydraulic components for adjusting the position of the blade 20. For example, the vehicle 10 may include one or more actuators, such as one or more hydraulic lift cylinders 36, coupled between the pivot arms 34 and the chassis 12 to allow the position of the blade 20 to be adjusted relative to both the chassis 12 and the ground. For example, retraction/actuation of the lift cylinder(s) 36 may result in the pivot arms 34 pivoting relative to the chassis 12, thereby raising and lower the blade 20 relative to the ground. In addition, the vehicle 10 may also include one or more actuators, such as one more hydraulic tilt cylinders (not shown), configured to adjust the tilt angle or orientation of the blade 20 relative to the pivot arms 34. For example, the tilt cylinder(s) may be coupled between the pivot arms 34 and the blade 20 to allow the blade 20 to be pivoted about a pivot point defined relative to the pivot arms 34.

Figure 2:
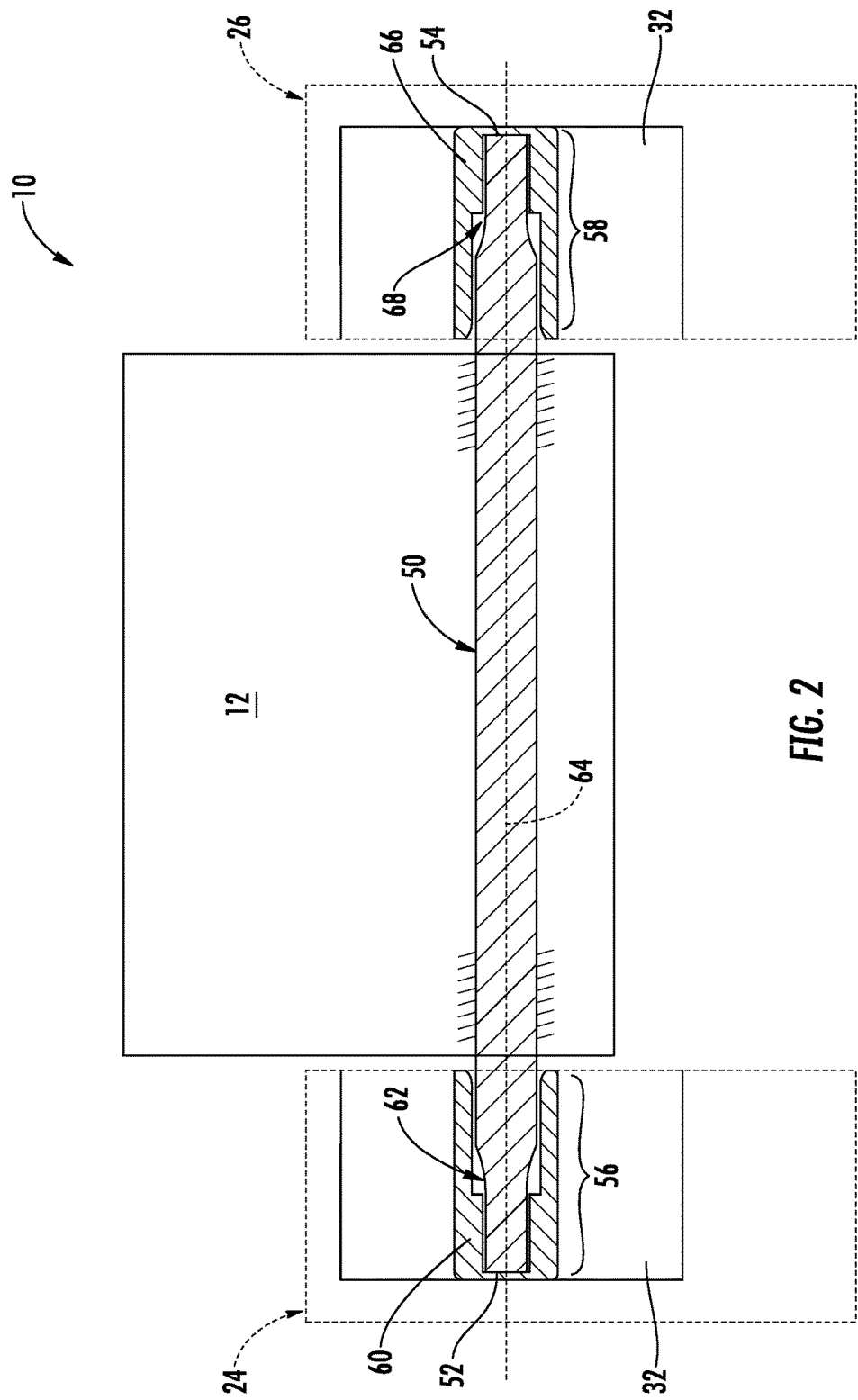
FIG. 2 illustrates a schematic view of one embodiment of an arrangement for pivotally coupling track assemblies of a work vehicle to the vehicle's chassis in accordance with aspects of the present subject matter.

Referring now to FIG. 2, a schematic view of one embodiment of an arrangement for pivotally coupling each of the track assemblies 24, 26 to the chassis 12 of the work vehicle 10 is illustrated in accordance with aspects of the present subject matter. As shown, the work vehicle 10 may include a fixed pivot shaft 50 rigidly coupled to the vehicle's chassis 12 that extends axially between a first shaft end 52 and a second shaft end 54. Additionally, each track assembly 24, 26 may include a pivot shaft tube or housing configured to receive one of the ends 52, 54 of the pivot shaft 50. For example, as shown in the illustrated embodiment, a first pivot shaft housing 60 of the first track assembly 24 is configured to receive the first shaft end 52 of the pivot shaft 50 such that a first axial portion 56 of the pivot shaft 50 extends axially within the housing 60. In such an embodiment, a first pivot interface 62 may be defined between the first pivot shaft housing 62 and the first axial portion 56 of the pivot shaft 50 to allow the housing 62 to rotate relative to the pivot shaft 50 about a central pivot axis 64 of the shaft 50. Similarly, a second pivot shaft housing 66 of the second track assembly 26 is configured to receive the second shaft end 54 of the pivot shaft 50 such that a second axial portion 58 of the pivot shaft 50 extends axially within such housing 66. In such an embodiment, a second pivot interface 68 may be defined between the second pivot shaft housing 66 and the second axial portion 58 of the pivot shaft 50 to allow the housing 66 to rotate relative to the pivot shaft 50 about the central pivot axis 64.

As is generally understood, each pivot shaft housing 60, 66 may, in turn, be rigidly or fixedly coupled to the track frame 32 of its respective track assembly 24, 26. As such, each track assembly 24, 26 may be configured to pivot relative to the chassis 12 about the central pivot axis 64 at the pivot interface 62, 68 defined between its respective pivot shaft housing 60, 66 and the adjacent axial portion 56, 58 of the pivot shaft 50.

Figure 3:
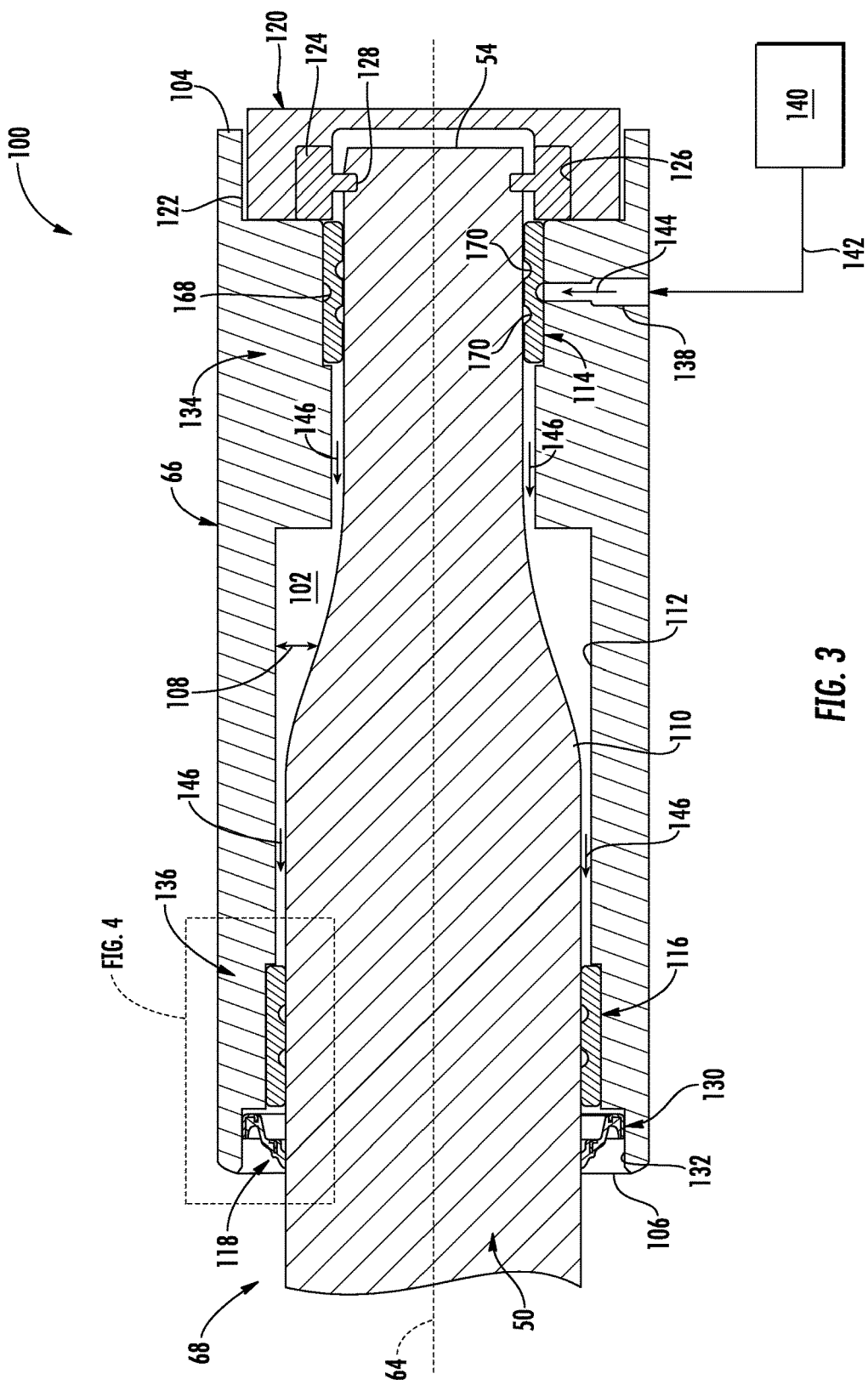
FIG. 3 illustrates a cross-sectional view of one embodiment of a system for lubricating a pivot interface defined between adjacent components of a work vehicle in accordance with aspects of the present subject matter, particularly illustrating the pivot interface defined between a pivot shaft and a corresponding pivot shaft housing of the work vehicle.
Figure 4:
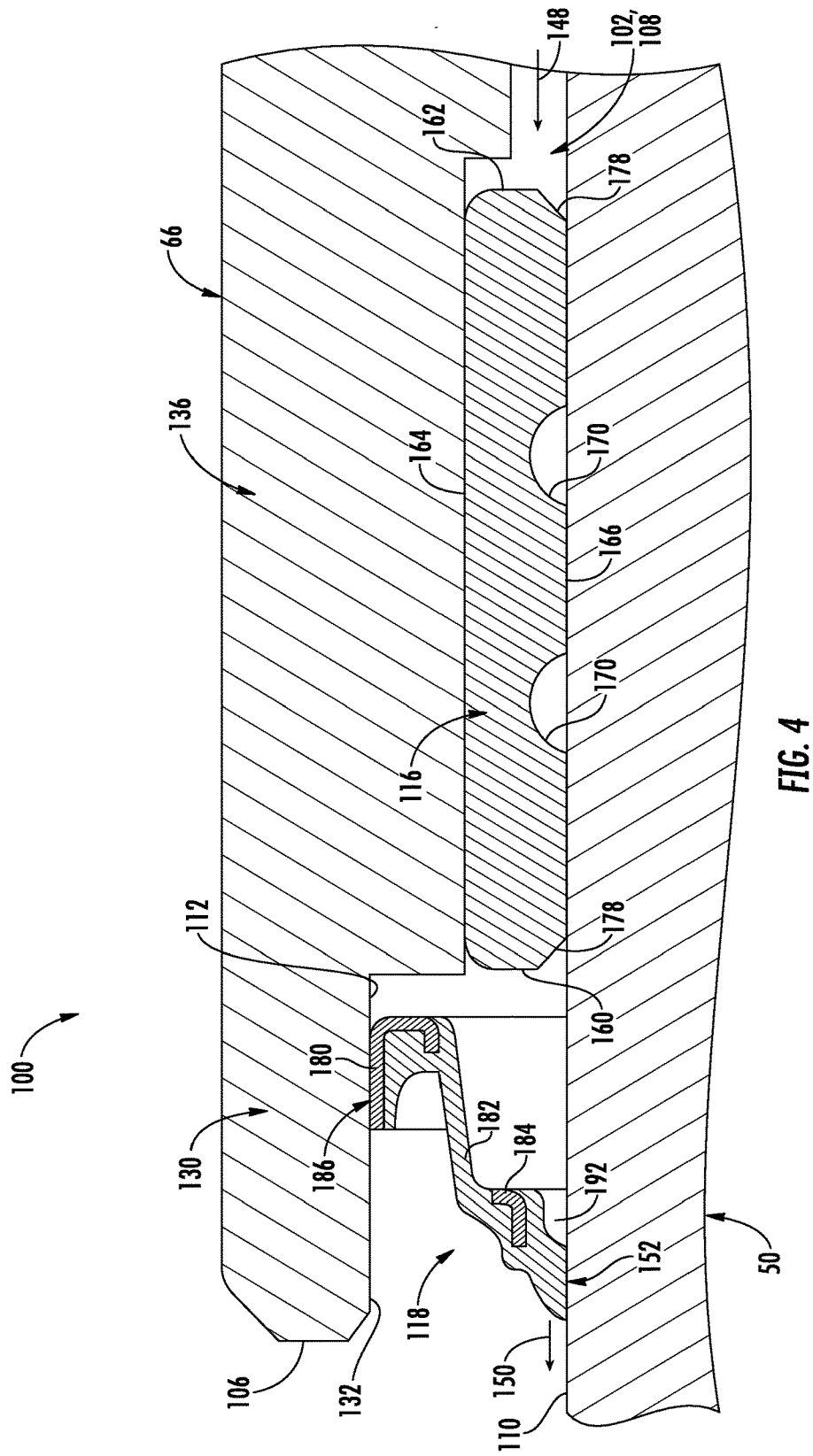
FIG. 4 illustrates a cross-sectional view of a portion of the system shown in FIG. 3, particularly illustrating the portion of the pivot interface identified in the box labeled "FIG. 4" in FIG. 3.

Referring now to FIGS. 3 and 4, cross-sectional views of one embodiment of a system 100 for lubricating a pivot interface defined between adjacent components of a work vehicle is illustrated in accordance with aspects of the present subject matter. Specifically, FIG. 3 illustrates a cross-sectional view of one embodiment of various components that may be included within or otherwise associated with the disclosed system 100. Additionally, FIG. 4 illustrates an enlarged cross-sectional view of a portion of the system components shown in FIG. 3 (e.g., as indicated by the "FIG. 4" box shown in FIG. 3).

In general, the system 100 will be described herein with reference to the pivot interface 68 defined between the second axial portion 58 of the pivot shaft 50 and the pivot shaft housing 66 of the second track assembly 26 described above with reference to FIG. 2. However, it should be appreciated that the disclosed system arrangement may be similarly applied to the pivot interface 62 defined between the first axial portion 56 of the pivot shaft 50 and the pivot shaft housing 66 of the first track assembly 24. Additionally, it should be appreciated that, in other embodiments, one or more aspects of the disclosed system 100 may be utilized to allow an interface defined between any other suitable components of a work vehicle to be lubricated, including any suitable pivot interface across which one vehicle component pivots or rotates relative to another vehicle component.

As shown in FIG. 3, the pivot shaft housing 66 of the disclosed system 100 may generally have a hollow configuration defining an open-ended shaft cavity 102 extending axially between a first axial end 104 of the housing 66 and an opposed second axial end 106 of the housing 66. In general, the shaft cavity 102 may be configured to receive the adjacent shaft end 54 of the pivot shaft 50 such that the associated axial portion 58 (FIG. 2) of the pivot shaft 50 generally extends axially along all or a portion of the shaft cavity 102 defined between the opposed ends 104, 106 of the housing 66. For instance, as shown in the illustrated embodiment, the pivot shaft 50 may be installed within the housing 66 such that the shaft end 54 is located at or adjacent to the first axial end 104 of the housing 66. In such an embodiment, the axial portion of the pivot shaft 50 received within the cavity 102 may generally extend axially from the shaft end 54 to the opposed axial end 106 of the housing 66.

Additionally, as shown in FIG. 3, in several embodiments, the diameter of the shaft cavity 102 may be larger than the outer diameter of the pivot shaft 50 such that a radial gap 108 is defined across the shaft cavity 102 that extends radially between an outer surface 110 of the pivot shaft 50 and an inner surface 112 of the pivot shaft housing 66. As will be described below, the radial gap 108 may be configured to accommodate one or more additional components of the disclosed lubrication system 100, such as one or more bushings 114, 116 for rotationally supporting the pivot shaft housing 66 relative to the pivot shaft 50 and a sealing device 118 configured to seal the radial gap 108 defined between the pivot shaft 50 and the pivot shaft housing 66 at a given location for maintaining a lubricant, such as grease, within the shaft cavity 102.

Moreover, as shown in FIG. 3, in one embodiment, the system 100 may also include an end cap 120 positioned at the first axial end 104 of the housing 66 for sealing or closing off such end 104 of the housing 66. Specifically, in the illustrated embodiment, the end cap 120 may be received within a cap bore 122 defined at and/or adjacent to the first axial end 104 of the housing 66 such that the adjacent end 54 of the pivot shaft 50 is received within a portion of the end cap 120 when the cap 120 is inserted into the cap bore 122. In such an embodiment, the end cap 120 may be sealed against the adjacent end 54 of the pivot shaft 50 and/or any adjacent portion(s) of the housing 66 to seal off the first axial end 104 of the housing 66, thereby preventing any lubricant contained within the shaft cavity 102 from being expelled from the housing 66 at its first axial end 104. For example, a suitable seal(s) may be provided between the end cap 120 and the housing 66 to provide a sealed interface between the end cap 120 and the housing 66 at its first axial end 104, such as by adding a sealant between one or more of the interfaces defined between the end cap 120 and the housing 66. Alternatively, the end cap 120 may be configured to be press-fit into the cap bore 122 to provide a sealed interface between the end cap 120 and the housing 66. Additionally, as shown in FIG. 3, in one embodiment, a set of shims and an associated retaining ring (collectively labeled as "124" in FIG. 3) may be provided in operative association with the end cap 120 that extend radially between an inner circumferential surface 126 of the end cap 120 and the outer surface 110 of the pivot shaft 50 (e.g., within a seal groove 128 defined relative to the outer shaft surface 110) to align the housing 66 with the vehicle's chassis 12 and/or to retain the housing 66 on the pivot shaft 50.

As indicated above, the system 100 may also include a sealing device 118 configured to seal the radial gap 108 defined between the pivot shaft 50 and the pivot shaft housing 66 at a given location spaced axially apart from the end cap 120. For example, as shown in the illustrated embodiment, the sealing device 118 may be installed between the pivot shaft 50 and the pivot shaft housing 66 at a seal location 130 disposed generally adjacent to the second axial end 106 of the housing 66, such as within a seal bore 132 defined at and/or adjacent to the second axial end 106 of the housing 66. In such an embodiment, the radial gap 108 defined across the axial section of the shaft cavity 102 extending between the sealing device 118 and the end cap 120 may provide a sealed volume within which lubricant may be maintained for lubricating the pivot interface 68 defined between the pivot shaft 50 and the pivot shafting housing 66. In addition to maintaining the lubricant within the shaft cavity 102, the sealing device 118 may also be configured to prevent contaminants, such as dust, water, and/or the like, from entering the shaft cavity 102 and contaminating the lubricant.

As will be described in greater detail below, the sealing device 118 may, in several embodiments, be configured to maintain a sealed interface between the pivot shaft 50 and the pivot shaft housing 66 when the fluid pressure of the lubricant contained within the shaft cavity 102 is less than a cracking pressure associated with the sealing device 118. In general, the cracking pressure may correspond to a fluid pressure that generally exceeds the pressure of the lubricant within the shaft cavity 102 during normal operating conditions. As a result, during operation of the work vehicle 10, the sealing device 118 may function to maintain the lubricant within the shaft cavity 102. However, when the fluid pressure within the shaft cavity 102 is increased above the seal's cracking pressure, the sealing device 118 may be configured to transition to an unsealed state to allow the lubricant contained within the shaft cavity 102 to flow past the sealing device 118 and be expelled from the pivot shaft housing 66 at its second axial end 106. For instance, when lubricating the pivot interface 68 defined between the pivot shaft 50 and the pivot shaft housing 66, the lubricant may be injected into the shaft cavity 102 at a higher pressure than the cracking pressure for the sealing device 118. As a result, when the pressure of the lubricant within the shaft cavity 102 exceeds the cracking pressure, any excess and/or pre-existing lubricant may be purged from the shaft cavity 102 as the sealing device 118 "cracks" or otherwise transitions to its unsealed state.

Additionally, as indicated above, the system 100 may include one or more bushings 114, 116 for rotationally supporting the pivot shaft housing 66 relative to the pivot shaft 50. For instance, in the illustrated embodiment, the system 100 includes a first bushing 114 installed between the pivot shaft 50 and the pivot shaft housing 66 at a first bushing location 134 and a second bushing 116 installed between the pivot shaft 50 and the pivot shaft housing 66 at a second bushing location 136 spaced apart axially from the first bushing location 134. Specifically, in one embodiment, the first bushing 114 may generally be disposed at a bushing location 134 defined axially between the second bushing 116 and the end cap 120 such that the first bushing 114 is located closer to the first axial end 102 of the housing 66 than the second bushing 116. For example, as shown in FIG. 3, the first bushing 114 may be located directly adjacent to the end cap 120 to allow the bushing 114 to rotationally support the pivot shaft housing 66 relative to the adjacent end 54 of the pivot shaft 50. Additionally, the second bushing 116 may generally be disposed at a bushing location 136 defined axially between the first bushing 114 and the sealing device 118 such that the second bushing 116 is located closer to the second axial end 106 of the housing 66 than the second bushing 116. For example, as shown in FIG. 3, the second bushing 116 may be located directly adjacent to the sealing device 118 to allow the bushing 116 to rotationally support the pivot shaft housing 66 relative to the pivot shaft 50 at the opposite end 106 of the housing 66 from the first bushing 114.

Referring still to FIG. 3, the pivot shaft housing 66 may also define a lubricant injection port 138 in fluid communication with the shaft cavity 102 for supplying lubricant into the interior of the housing 66. For example, in the illustrated embodiment, the injection port 138 is defined through the pivot shaft housing 66 such that the port 138 extends from the exterior of the housing 66 to the interior shaft cavity 102 defined within the interior of the housing 66. As a result, when the lubricant port 138 may is fluidly coupled to a lubricant source 140, such as a grease gun or any other suitable source of lubrication, via a suitable supply conduit, such as a grease tube (e.g., as indicated by arrow 142), lubricant may be directed from the source 140 through both the supply conduit 142 and the injection port 138 for delivery into the shaft cavity 102.

In general, the lubricant injection port 138 may be defined through the housing 66 at any suitable location that allows lubricant to be injected into the portion of the shaft cavity 102 extending axially between the sealing device 118 and the end cap 120. For example, as shown in the illustrated embodiment, the injection port 138 is axially aligned with the first bushing 114. In such an embodiment, as will be described below, the bushing 114 may include suitable features, such as pass-through holes and lubricant grooves, to allow the lubricant injected into the shaft cavity 102 via the port 138 to flow through, across, and/or along the bushing 114 for subsequent delivery to the remainder of the shaft cavity 102. Alternatively, the lubrication injection part 138 may be defined through the housing 66 at any other suitable location, such as at a location disposed axially between the bushings 114, 116 or at a location that is axially aligned with the second bushing 116. Additionally, it should be appreciated that, in further embodiments, the injection port 138 may be defined through any other suitable system component that allows lubricant to be injected into the shaft cavity 102. For instance, in one embodiment, the injection port 138 may be defined through the end cap 120 for supplying lubricant into the interior shaft cavity 102.

It should be appreciated that, when lubricating the pivot interface 68 defined between the pivot shaft 50 and the pivot shaft housing 66 for the first time, lubricant is injected through the injection port 138 (e.g., as indicated by arrow 144 in FIG. 3) and is initially directed through, across, and/or around the first bushing 114. As additional lubricant is injected into the shaft cavity 102 via the injection port 138 in order to fill the radial space defined between the pivot shaft 50 and the pivot shaft housing 66, the lubricant flows axially from the first bushing 114 through the radial gap 108 towards the second bushing 116 (e.g., as indicated by arrows 146 in FIGS. 3 and 4). As will be described below, similar to the first bushing 114, the second bushing 116 may include suitable features, such as lubricant grooves, to allow the lubricant to flow through, across, and/or along the bushing 116 (e.g., at the interface defined between the second bushing 116 and the pivot shaft 50). The lubricant may then flow from the second bushing 114 to the sealing device 118 (e.g., as indicated by arrow 148 in FIG. 4). As indicated above, the sealing device 118 may serve to seal the radial gap 108 defined between the pivot shaft 50 and the housing 66 at the location 130 of the seal 118 when the fluid pressure within the shaft cavity 102 is below the seal's cracking pressure. Thus, when injecting lubricant into the shaft cavity 102 at an injection pressure above the seal's cracking pressure, the sealing device 118 may function to provide a sealed interface between the pivot shaft 50 and the pivot shaft housing 66 at the seal location 130 as the shaft cavity 102 is being filled with lubricant. However, once the radial space defined between the pivot shaft 50 and the pivot shaft housing 66 is completely filled with lubricant, the pressure within the shaft cavity 102 will exceed the seal's cracking pressure, thereby cracking the seal and allowing excess lubricant to be purged from the shaft cavity 102 (e.g., as indicated by arrow 150 in FIG. 4). For instance, a sealed interface 152 (FIG. 4) defined between the sealing device 118 and the outer surface 110 of the pivot shaft 50 may become unsealed when the sealing device 118 transitions to its unsealed state, thereby allowing lubricant to pass between the sealing device 118 and the pivot shaft 50.

Additionally, upon initially lubricating the pivot interface 68 defined between the pivot shaft 50 and the pivot shaft housing 66, such interface 68 is typically re-lubricated with new lubricant on a periodic basis. As a result, when new lubricant is injected into the shaft cavity 102 at a pressure that exceeds the cracking pressure of the sealing device 118, the pre-existing lubricant (along with any contaminates contained within the lubricant) may be purged from the shaft cavity 102. Specifically, as the new lubricant flows into the cavity 102 and the fluid pressure within the cavity 102 is increased to a level above the seal's cracking pressure, the sealing device 118 may transition to its unsealed state to allow the pre-existing lubricant (and associated contaminates) to flow between the sealing device 118 and the pivot shaft 50 and be subsequently purged from the pivot shaft housing 66. In such instance, the new lubricant may be pumped or injected into the shaft cavity 102 for a predetermined period of time or until it is otherwise confirmed (e.g., via a visual inspection of the grease expelled from the housing 66) that the pre-existing lubricant has been fully or substantially purged from the shaft cavity 102.

Figure 5:
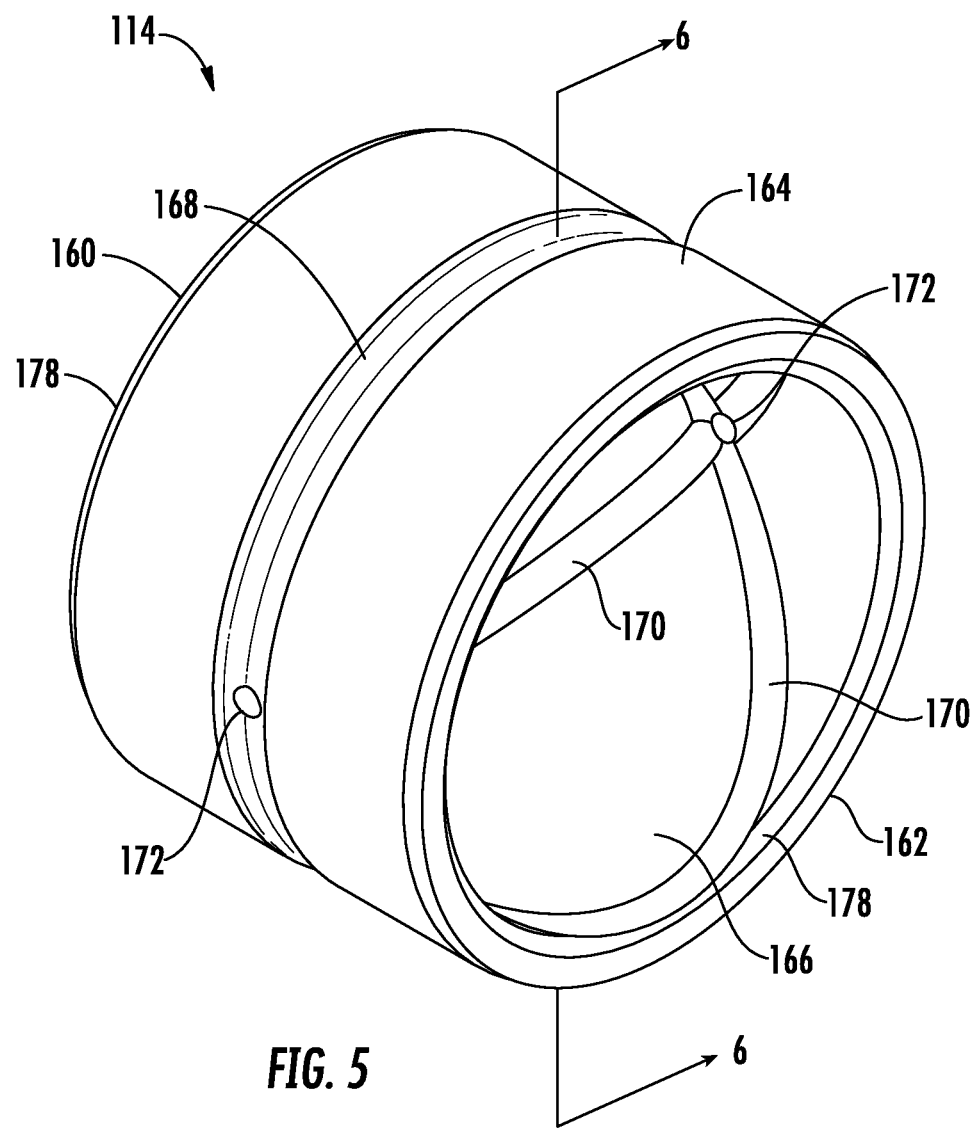
FIG. 5 illustrates a perspective view of one embodiment of a bushing suitable for use within the disclosed system in accordance with aspects of the present subject matter.
Figure 6:
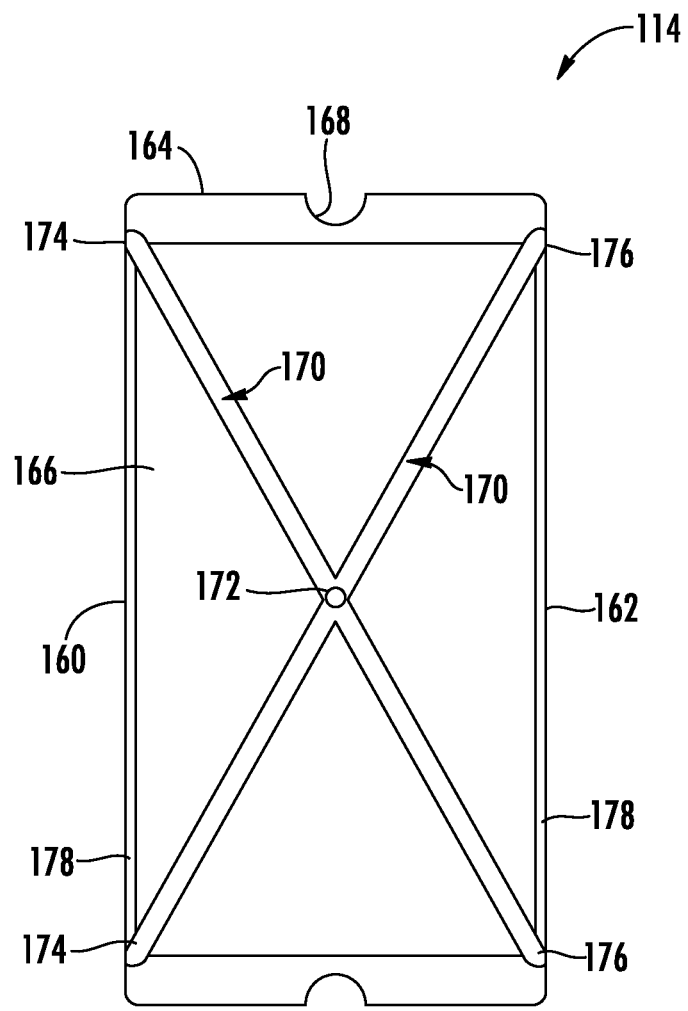
FIG. 6 illustrates a cross-sectional view of the bushing shown in FIG. 5 taken about line 6-6.

Referring now to FIGS. 5 and 6, differing views of one embodiment of a suitable bushing configuration that may be utilized for one or more of the bushings 114, 116 of the disclosed system 100 is illustrated in accordance with aspects of the present subject matter. Specifically, FIG. 5 illustrates a perspective view of the bushing and FIG. 6 illustrates a cross-sectional of the bushing shown in FIG. 5 taken about line 6-6. In general, the bushing configuration shown in FIGS. 5 and 6 will be described with reference to the first bushing 114 of the embodiment of the system 100 shown in FIG. 3. However, as will be described below, the same or a similar bushing configuration may also be utilized for the second bushing 116 of the embodiment of the system 100 shown in FIG. 3.

As shown in FIGS. 5 and 6, the bushing 114 may generally correspond to an annular or ring-shaped member extending axially between a first bushing end 160 and a second bushing end 162. Additionally, the bushing 114 may generally include an outer surface 164 and an inner surface 166 extending between its opposed ends 160, 162, with the outer surface 164 defining an outer circumference of the bushing 114 and the inner surface 166 defining an inner circumference of the bushing 114. As a result, when installed within the pivot shaft housing 66, the outer surface 164 of the bushing 114 may generally be configured to be engaged against the inner surface 112 of the pivot shaft housing 66. Similarly, when the pivot shaft 50 is installed relative to the bushing 114, the inner surface 166 of the bushing 114 may generally be configured to extend adjacent to outer surface 110 of the pivot shaft 50.

As indicated above, the bushing 114 may also be configured to include one or more features for allowing lubricant to flow through, around, and/or across the bushing 114, thereby permitting the lubricant to be distributed throughout the shaft cavity 102 when it is injected therein via the lubrication port 138. For example, as shown in FIGS. 5 and 6, the bushing 114 may include one or more outer lubricant grooves 168 defined along the outer surface 164 of the bushing 114 to allow lubricant to flow around the outer circumference of the bushing 114 and one or more inner lubricant grooves 170 defined along the inner surface 166 of the bushing 114 to allow lubricant to flow around the inner circumference of the bushing 114. Additionally, the bushing 114 may also include one or more pass-through openings 172 defined between the outer and inner surfaces 164, 166 of the bushing 114 to allow lubricant to flow through the bushing 114 from its outer circumference to its inner circumference. For example, as shown in the illustrated embodiment, the bushing 114 includes first and second pass-through openings 172 spaced apart circumferentially by 180 degrees, with each pass-through opening 172 extending radially between the outer lubricant groove(s) 168 and the inner lubricant groove(s) 170. In such an embodiment, the outer lubricant groove(s) 168 may be configured to be aligned with or otherwise in fluid communication with the lubricant injection port 138 defined through the housing 66 to allow lubricant to be supplied into the outer lubricant groove(s) 168. For instance, as shown in FIG. 3, the outer lubricant groove(s) 168 of the first bushing 114 is axially aligned with the lubricant injection port 138. As such, lubricant injected through the port 138 may flow into the outer lubricant groove(s) 168 and around the outer circumference of the bushing 114. The lubricant may then pass through the bushing 114 via the pass-through openings 172 for flow through the inner lubricant groove(s) 170 of the bushing 114.

Moreover, as shown in FIGS. 5 and 6, the inner lubricant groove(s) 170 may generally be defined relative to the inner surface 166 of the bushing 114 such that the groove(s) 170 defines a flow path for directing lubricant from each pass-through opening 172 to one or both of the opposed axial ends 160, 162 of the bushing 114. For instance, in the illustrated embodiment, the bushing 114 includes inner lubricant grooves 170 generally forming an "X-shaped" pattern along the inner circumference of the bushing 114, with each groove 170 extending between a first groove end 174 (FIG. 6) terminating at the first end 160 of the bushing 114 and a second groove end 176 (FIG. 6) terminating at the second end 162 of the bushing 114. In such an embodiment, the pass-through openings 172 may generally be formed through the bushing 114 at the locations of the intersections of the inner lubricant grooves 170 to allow lubricant from the outer lubricant groove(s) 168 to be directed to the inner lubricant grooves 170. The lubricant may then flow through the inner lubricant grooves 160 to each end 160, 162 of the bushing 114. Additionally, as shown in FIGS. 5 and 6, a chamfered edge 178 may be defined at each axial end 160, 162 of the bushing 114 around its inner circumference to allow the lubricant to be directed into and/or out of the inner lubricant grooves 170. As a result, the lubricant flowing across the inner circumference of the bushing 114 may be expelled from the inner lubricant grooves 170 at the inner chamfered edges 178 of the bushing 114. Thereafter, as described above with reference to FIG. 3, the lubricant may then flow from the bushing 114 to other portions of the shaft cavity 102.

It should be appreciated that the bushing configuration shown in FIGS. 5 and 6 may be utilized primarily for a bushing configured to be aligned with the lubricant injection port 138 of the pivot shaft housing 66, such as the first bushing 114 in the embodiment of the system 100 shown in FIG. 3. However, when there is no need to allow lubricant to flow between the outer and inner circumference of the bushing 114, the outer lubricant groove(s) 168 and the associated pass-through openings 172 may be eliminated. For example, as particularly shown in FIG. 4, the second bushing 116 of the disclosed system 100 may simply include one or more inner lubricant grooves 170 defined around its inner circumference, thereby allowing the lubricant injected into the shaft cavity 104 to flow axially between the second bushing 116 and the pivot shaft 50 towards the sealing device 118.

Figure 7:
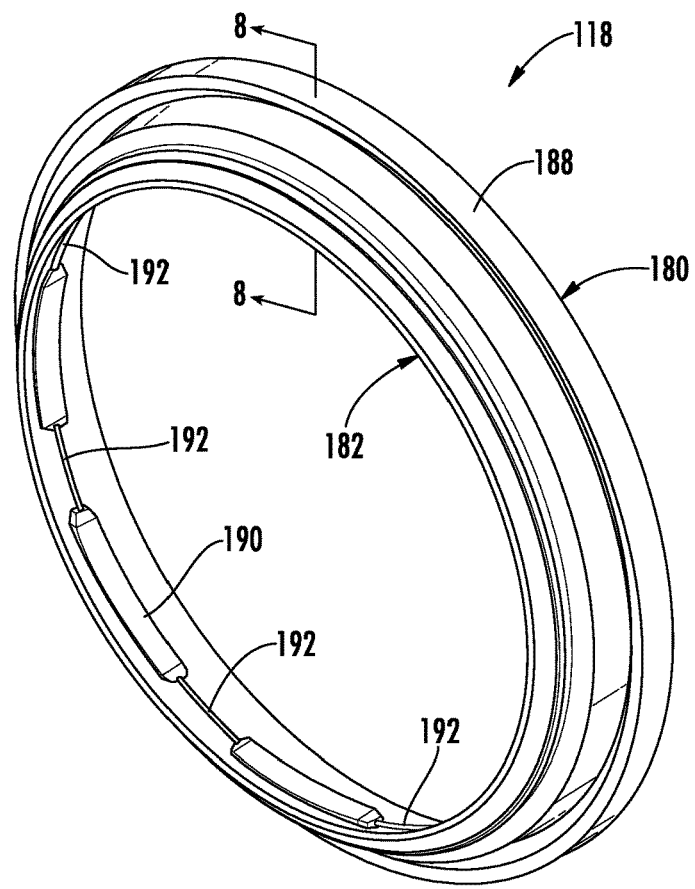
FIG. 7 illustrates a perspective view of one embodiment of a sealing device suitable for use within the disclosed system in accordance with aspects of the present subject matter.
Figure 8:
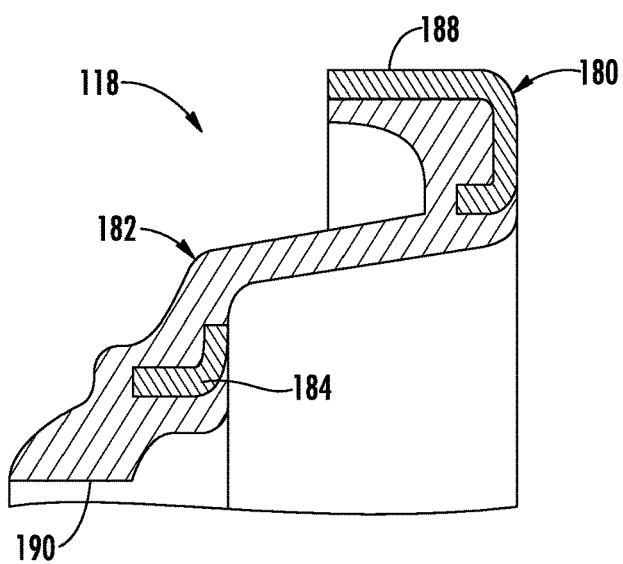
FIG. 8 illustrates a cross-sectional view of the sealing device shown in FIG. 7 taken about line 8-8.

Referring now to FIGS. 7 and 8, differing views of one embodiment of a suitable configuration for the sealing device 118 of the disclosed system 100 is illustrated in accordance with aspects of the present subject matter. Specifically, FIG. 7 illustrates a perspective view of the sealing device 118 and FIG. 8 illustrates a partial, cross-sectional view of the sealing device 118 shown in FIG. 7 taken about line 8-8.

As shown in FIGS. 7 and 8, the sealing device 118 may generally include an outer retaining ring 180, an elastomeric ring 182 extending radially inwardly from the outer retaining ring 180, and an inner support ring 184 spaced radially inwardly from the outer retaining ring 180. In general, the outer retaining ring 180 may define the outer circumference of the sealing device 118. Thus, the outer retaining ring 180 may generally be configured to be engaged with or otherwise sealed against the inner surface 112 of the pivot shaft housing 66 when the sealing device 118 is installed within the housing 66. For example, in one embodiment, the outer retaining ring 180 may be configured to be press-fit into the pivot shaft housing 66 such that a sealed interface 186 (FIG. 4) is defined between the inner surface 112 of the housing 66 and an outer surface 188 of the outer retaining ring 180.

Additionally, the elastomeric ring 182 of the sealing device 118 may generally be configured to extend radially inwardly from the retaining ring 180 such that the elastomeric ring 182 defines an inner circumference of the sealing device 118. As such, elastomeric ring 182 may generally be configured to be engaged with or otherwise sealed against the outer surface 110 of the pivot shaft 50 when the shaft 50 is inserted through the sealing device 118. For example, in one embodiment, the elastomeric ring 182 may be configured to be compressed between the pivot shaft 50 and the pivot shaft housing 66 such that a sealed interface 152 (FIG. 4) is defined between the outer surface 110 of the pivot shaft 50 and an inner surface 190 of the elastomeric ring 182.

It should be appreciated that the elastomeric ring 182 may generally be configured to serve as the resilient sealing member of the sealing device 118. Thus, in addition to providing a sealed interface 152 between the outer surface 110 of the pivot shaft 50 and an inner surface 190 of the elastomeric ring 182, the elastomeric ring 182 may also be configured to flex to accommodate slight deflections of the pivot shaft 50 and/or to accommodate slight misalignments between the pivot shaft 50 and pivot shaft housing 66. For example, the elastomeric ring 182 may be formed from a suitable polymer material that provides the elastomeric ring 182 with a desired degree of flexibility, such as rubber or any other suitable material.

Moreover, as particularly shown in FIG. 8, the inner support ring 184 may be configured to be incorporated into or otherwise extend within a portion of the elastomeric ring 182 at a location spaced radially inwardly from the outer retaining ring 180. In general, the inner support ring 184 may be configured to provide a degree of structural support and/or stiffness to the elastomeric ring 182. For instance, the inner support ring 184 may be designed to provide sufficient stiffness to the elastomeric ring 182 such that the sealed interface 152 defined between the elastomeric ring 182 and the outer surface 110 of the pivot shaft 50 is maintained when the lubricant pressure within the shaft cavity 102 is at or below the cracking pressure of the sealing device 118.

Additionally, in several embodiments, the sealing device 118 may also include one or more lubricant purge slots 192 defined relative to the inner surface 190 of the elastomeric ring 182. For example, as shown in FIG. 7, a plurality of purge slots 192 are defined in the elastomeric ring 182 at circumferentially spaced apart locations around the inner circumference of the sealing device 118. In general, the purge slots 192 may be configured to define a flow path for the lubricant between the elastomeric ring 182 and the outer surface 110 of the pivot shaft 50 when the sealing device 118 transitions to its unsealed state. For instance, when the fluid pressure within the shaft cavity 102 exceeds the cracking pressure of the sealing device 118, the elastomeric ring 182 may be configured to flex radially outwardly away from the outer surface 110 of the pivot shaft 50, thereby allowing the lubricant to flow through the purge slots 192 and between the radial gap or "crack" created between the inner surface 190 of the elastomeric ring 182 and the outer surface 110 of the pivot shaft 50.

It should be appreciated that, in general, the sealing device 118 may generally be configured to "crack" or transition to its unsealed state at any suitable cracking pressure. However, in several embodiments, the sealing device 118 may be configured such that its cracking pressure generally ranges from about 30 pounds-per-square inch (psi) to about 50 psi, such as from about 30 psi to about 40 psi or from about 40 psi to about 50 psi or from about 35 psi to about 45 psi and/or any other suitable subranges therebetween.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for lubricating a pivot interface defined between adjacent components of a work vehicle, the system comprising:
   a shaft;
   a shaft housing defining a shaft cavity extending axially between a first axial end of the shaft housing and an opposed second axial end of the shaft housing, an axial portion of the shaft being received within the shaft cavity between the first and second axial ends such that the shaft housing is configured to rotate relative to the shaft about an axis, a radial gap being defined within the shaft cavity between an inner surface of the shaft housing and an outer surface of the shaft, the first axial end of the shaft housing correspond to a sealed end of the shaft housing;
   a bushing positioned within the shaft cavity at a bushing location disposed axially between the first axial end of the shaft housing and the second axial end of the shaft housing, the bushing extending radially between the shaft housing and the shaft at the bushing location; and
   a sealing device positioned within the shaft cavity at a seal location disposed axially between the bushing and the second axial end of the shaft housing, the sealing device configured to seal the radial gap defined between the shaft housing and the shaft at the seal location when a fluid pressure within the shaft cavity is below a cracking pressure for the sealing device,
   wherein, when the fluid pressure within the shaft cavity exceeds the cracking pressure, the sealing device is configured to transition to an unsealed state at the seal location to allow lubricant contained within the shaft cavity to flow axially between the sealing device and the shaft towards the second axial end of the shaft housing.

2. The system of claim 1, wherein the bushing corresponds to a first bushing and the bushing location corresponds to a first bushing location, further comprising a second bushing spaced axially apart from the first bushing, the first bushing location being disposed axially between the first axial end of the shaft housing and the second bushing, the second bushing being positioned at a second bushing location disposed axially between the first bushing and the second axial end of the shaft housing.

3. The system of claim 2, wherein the sealing device is positioned axially between the second bushing and the second axial end of the shaft housing.

4. The system of claim 1, wherein the bushing extends axially between a first bushing end and a second bushing end, the bushing including an inner surface defining an inner circumference of the bushing, at least one inner lubricant groove being defined along the inner surface of the bushing to allow lubricant to flow between the first and second bushing ends at an interface defined between the inner surface of the bushing and the outer surface of the shaft.

5. The system of claim 4, wherein the bushing includes an outer surface defining an outer circumference of the bushing, a pass-through opening being defined between the outer surface of the bushing and the inner surface of the bushing to allow lubricant to flow from the outer circumference of the bushing to the at least one inner lubricant groove.

6. The system of claim 5, wherein at least one outer lubricant groove is defined along the outer surface of the bushing to allow lubricant to flow between across the outer circumference of the bushing at an interface defined between the outer surface of the bushing and the inner surface of the shaft housing.

7. The system of claim 1, further comprising a lubricant injection port defined through the shaft housing.

8. The system of claim 7, wherein the lubricant injection port is axially aligned with the bushing.

9. The system of claim 1, wherein the sealing device includes an outer retaining ring and an elastomeric ring extending radially inwardly from the outer retaining ring, the outer retaining ring configured to be engaged against the shaft housing such that a first sealed interface is defined between an outer surface of the outer retaining ring and the inner surface of the shaft housing, the elastomeric ring configured to be engaged against the shaft such that a second sealed interface is defined between an inner surface of the elastomeric ring and the outer surface of the shaft.

10. The system of claim 9, wherein the elastomeric ring is configured to flex radially outwardly away from the outer surface of the shaft when the fluid pressure within the shaft cavity exceeds the cracking pressure.

11. The system of claim 9, wherein one or more lubricant purge slots are defined around an inner circumference of the sealing ring, the lubricant being configured to flow through the one or more lubricant purge slots and between the elastomeric ring and the outer surface of the shaft when the fluid pressure within the shaft cavity is equal to or exceeds the cracking pressure.

12. The system of claim 1, further comprising an end cap installed relative to the first axial end of the shaft housing, the end cap being configured to seal the first axial end of the shaft housing.

13. The system of claim 1, wherein the shaft correspond to a pivot shaft rigidly coupled to a chassis of the work vehicle and the shaft housing correspond to a pivot shaft housing of a track assembly of the work vehicle.

14. A work vehicle, comprising:
a chassis;
a pivot shaft rigidly coupled to the chassis;
a track assembly including a pivot shaft housing, the pivot shaft housing defining a shaft cavity extending axially between a first axial end of the pivot shaft housing and an opposed second axial end of the pivot shaft housing, an axial portion of the pivot shaft being received within the shaft cavity between the first and second axial ends such that the pivot shaft housing is configured to rotate relative to the pivot shaft about an axis to allow the track assembly to pivot relative to the chassis, a radial gap being defined within the shaft cavity between an inner surface of the pivot shaft housing and an outer surface of the pivot shaft;
an end cap installed relative to the first axial end of the pivot shaft housing;
a bushing positioned within the shaft cavity at a bushing location disposed axially between the end cap and the second axial end of the pivot shaft housing; and
a sealing device positioned within the shaft cavity at a seal location disposed axially between the bushing and the second axial end of the pivot shaft housing, the sealing device configured to seal the radial gap defined between the pivot shaft housing and the pivot shaft at the seal location when a fluid pressure within the shaft cavity is below a cracking pressure for the sealing device,
wherein, when the fluid pressure within the shaft cavity exceeds the cracking pressure, the sealing device is configured to transition to an unsealed state at the seal location to allow lubricant contained within the shaft cavity to flow axially between the sealing device and the pivot shaft towards the second axial end of the pivot shaft housing.

15. The work vehicle of claim 14, wherein the bushing corresponds to a first bushing and the bushing location corresponds to a first bushing location, further comprising a second bushing spaced axially apart from the first bushing, the first bushing location being disposed axially between the end cap and the second bushing, the second bushing being positioned at a second bushing location disposed axially between the first bushing and the second axial end of the pivot shaft housing.

16. The work vehicle of claim 14, wherein the bushing extends axially between a first bushing end and a second bushing end, the bushing including an inner surface defining an inner circumference of the bushing, at least one inner lubricant groove being defined along the inner surface of the bushing to allow lubricant to flow between the first and second bushing ends at an interface defined between the inner surface of the bushing and the outer surface of the pivot shaft.

17. The work vehicle of claim 16, wherein the bushing includes an outer surface defining an outer circumference of the bushing, a pass-through opening being defined between the outer surface of the bushing and the inner surface of the bushing to allow lubricant to flow from the outer circumference of the bushing to the at least one inner lubricant groove.

18. The work vehicle of claim 14, further comprising a lubricant injection port defined through the pivot shaft housing, the lubricant injection port being axially aligned with the bushing.

19. The work vehicle of claim 14, wherein the sealing device includes an outer retaining ring and an elastomeric ring extending radially inwardly from the outer retaining ring, the outer retaining ring configured to be engaged against the pivot shaft housing such that a first sealed interface is defined between an outer surface of the outer retaining ring and the inner surface of the pivot shaft housing, the elastomeric ring configured to be engaged against the pivot shaft such that a second sealed interface is defined between an inner surface of the elastomeric ring and the outer surface of the pivot shaft.

20. The work vehicle of claim 19, wherein the elastomeric ring is configured to flex radially outwardly away from the outer surface of the pivot shaft when the fluid pressure within the shaft cavity exceeds the cracking pressure.

* * * * *